Jan. 24, 1961 L. D. STATHAM 2,968,942
FORCE TRANSDUCER
Filed Aug. 20, 1956 2 Sheets-Sheet 1
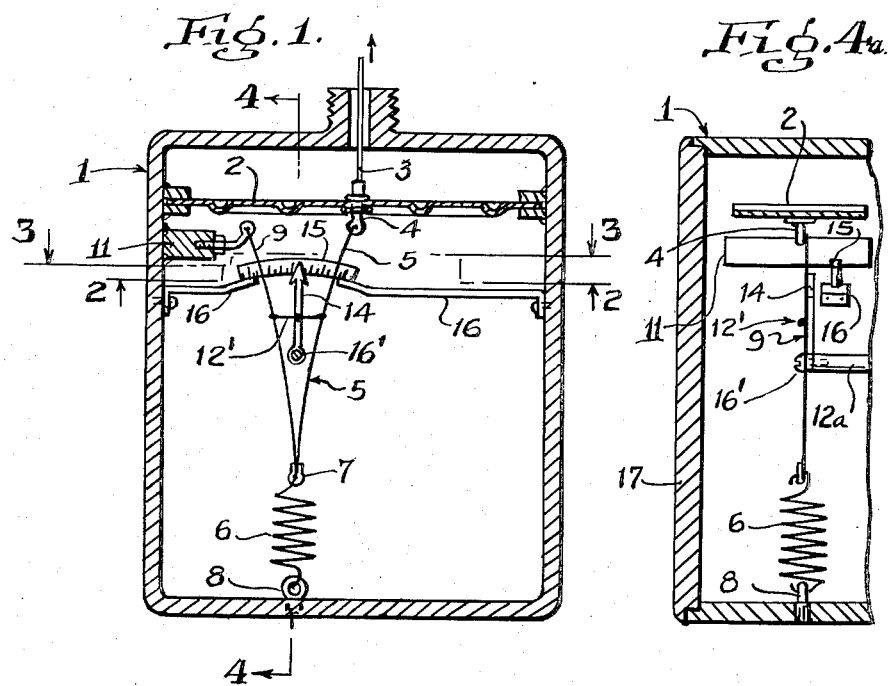
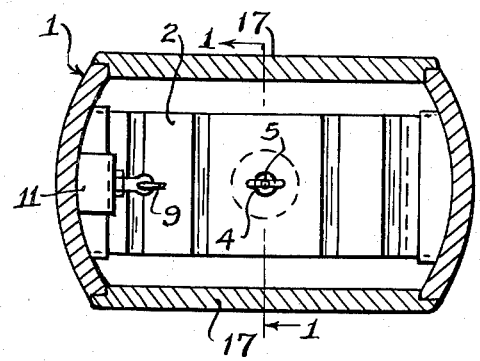
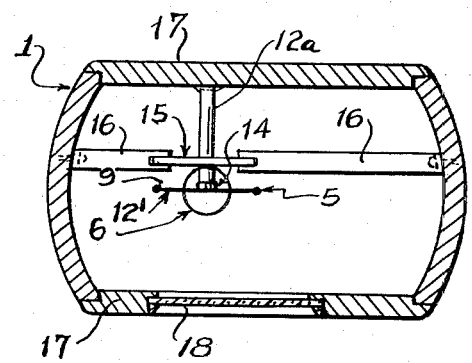
INVENTOR.
LOUIS D. STATHAM
By Philip Subkow
ATTORNEY Jan. 24, 1961  L. D. STATHAM  2,968,942
FORCE TRANSDUCER
Filed Aug. 20. 1956  2 Sheets-Sheet 2
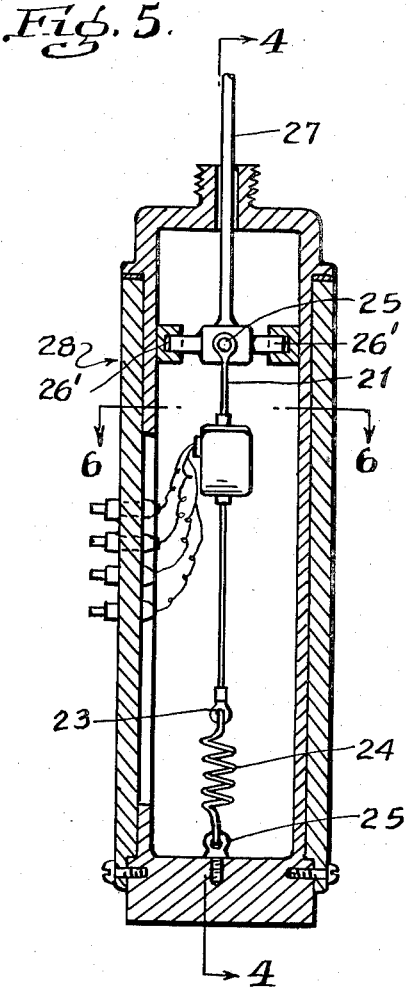
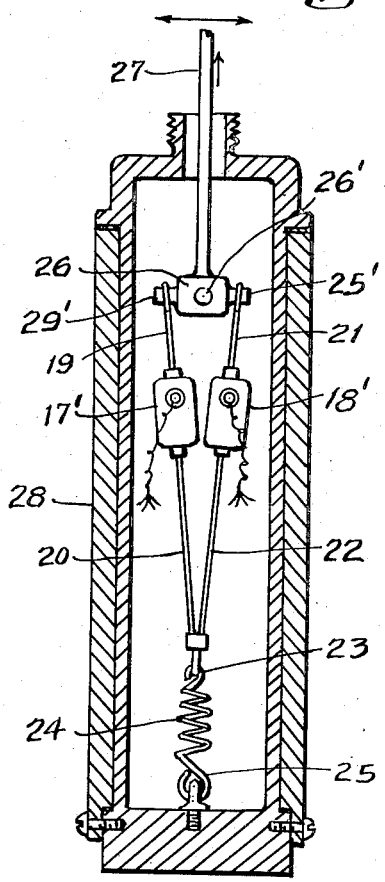
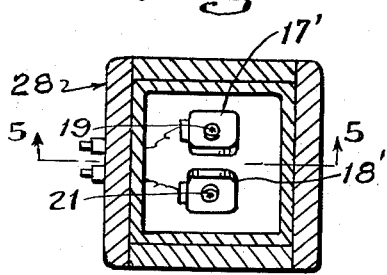
INVENTOR.
LOUIS D. STATHAM
BY
ATTORNEY.

United States Patent Office 2,968,942
Patented Jan. 24, 1961

2,968,942

FORCE TRANSDUCER

Louis D. Statham, Beverly Hills, Calif., assignor to Statham Instruments, Inc., Los Angeles, Calif., a corporation of California Filed Aug. 20, 1956, Ser. No. 605,098

20 Claims. (Cl. 73—141)

The application is a continuation-in-part of application Serial No. 502,663, filed April 20, 1955, now Patent No. 2,760,037.

This invention relates to transducers in which the force applied to or the displacement of the transducer induces a variation in tension in a tensioned member and means are provided for determining the variation in tension in the tensioned member. It is more particularly directed to the use of two tensioned members, one end of the first tensioned member being connected to a force summing means undergoing displacement as the result of a force or motion applied to the force summing means, and the other end is connected to a yieldable constraining means, the second tensioned member being also connected at one end to the constraining means. The other end of the second tensioned member is connected in such manner that upon said motion of the force summing means there results a movement, relative to each other, of the ends of the tensioned members which are not connected to the yieldable constraining means. Various types of tensiometers capable of responding to the variation in tension in the tensioned members in order to respond to and measure the variation of the tension in the tensioned members may be used.

Generally stated then my invention relates to a transducer consisting of a force summing member and at least two tensioned members, one thereof being attached to the force summing member and extending therefrom in tension to a first point of attachment and the other of said tension members extending in tension from the first point of attachment to a second point of attachment, both of said tension members at said first point of attachment being connected to a yieldable constraining means, and means whereby on displacement of said force summing means, a relative displacement of said first and second point of attachment occurs.

The second point of attachment may be one which is not displaced in space on the motion of the force summing means, for example, it may be fixed rigidly in space, for example, attached to a fixed point in the case or frame of the transducer. However, it may be movable so that it is displaced in space relative to the motion of the point of attachment of the tension member to the force summing means. Thus, the second point of attachment referred to above may move in an opposite direction to the point of attachment of the first mentioned tension member to the force summing means. It may move in a degree more or less than motion of the point of attachment to the force summing means. In all of these cases the motion of the force summing means causes a different change in the tension in one of the tension members than occurs in the other of said tension members, the tensions in both of the tension members change in opposite directions. The magnitude of this change may be equal or may be unequal.

In the preferred embodiment of my invention the constraint imposed upon the first point of attachment should preferably have a spring rate which is substantially less than the spring rate of the tensioned members. The spring rate as referred to in this specification is understood to be the ratio of the force exerted on tensioned members and the constraining means respectively to the displacement of the constraining means and the tensioned member respectively. Thus the ratio of a given force exerted on the tensioned members to the variation in strain in the tension members should be much greater than the ratio of the force exerted on the constraining means to the displacement of the constraining means. For example, if the constraining means is a spring the extension or movement of the spring resulting from the application of a given magnitude of force to the force summing means should be greater than the variation in the strain in the tension members resulting from the application of a force of the same magnitude and direction. As will be understood by those skilled in the art, the spring rate is the Hook's law constant of the tensioned members and of the constraining means where such constraining means is a spring.

In the structure of my transducer instead of using a spring, any other yieldable constraining means may be employed. Thus the constraining means may have zero spring rate where it is a weight which hangs from the first point of attachment to create the tension in the tension members. In such case the forces in tension created on both tension members upon motion of the force summing means are equal and opposite and the change in tension in one of the tension members is equal and opposite to the change in the other tension member and the transfer of force exerted by the force summing means is complete i.e., 100%. However, as the spring rate of the constraining means increases in magnitude, i.e., the constraining means becomes stiffer the force transfer falls from 100% and becomes zero when the first point of attachment is considered to be a rigid point. The first tension member, i.e., the one connected to the force summing means may then be considered to be stretched between the force summing means and a relatively immovable point, i.e., a rigid connection. No transfer of force from the first to the second tensioned members results. However, by employing a spring rate for the constraining means substantially less than the spring rate of the tensioned members, I may obtain practically complete transfer of force from one tension member to the other tension member. By holding the spring rate of the constraining means within the range of about 0.01 and even down to about 0.001 of the spring rate of the tension members, I may obtain a substantially complete transfer of force so that the variation in tension in one of the tensioned members may be more than about 99% of the variation in tension in the other tension member.

In the transducers of my invention, employing the above principle, the tension members are preferably in the form of an elongated flexible member such as a filament, cord or cable having substantially no resistance to an axial compressive or to a bending force, which has no component of axial tension. Thus where the tensioned members are such elongated flexible members connected in the transducer of this invention to the first summing means and to first and second points of attachment under an original tension in each of the tensioned members, a movement of the force summing means, which results in a reduction in tension in one of the tensioned members and increase in the tension in the other of the tensioned members, will cause an increase in the tension of such tensioned member for so long as any residual tension remains in the tensioned members whose tension is decreasing upon the motion of the force summing means. But when the original tension is removed from one of the tensioned members any further movement of the force summing means in the same direction will have no effect upon the other of the tensioned members and such other tensioned member will be only subject to the tension which is imposed upon it by the constraining means itself. Thus, where the tensiometer employed for the measurement of the tension in the tensioned members may be subject to damage because of an excessive application of tension to the member whose tension is increased responds, the transducer of my invention acts to introduce an overload safety means to prevent an exertion of tension in excess of the safe tension load which may be imposed upon the tensometer. These and other objects of my invention will be further described in connection with the drawings of which—

Fig. 1 is a section taken on line 1—1 of Fig. 2 of one form of my transducers employing one form of tensiometer;

Fig. 2 is a section taken on line 2—2 of Fig. 1;

Fig. 3 is a section on line 3—3 of Fig. 1;

Fig. 4 is a section taken on line 4—4 of Fig. 5; showing my transducer employing another form of tensiometer;

Fig. 4a is a fragmentary detail of the pointer mounting of the transducer of Fig. 1;

Fig. 5 is a section taken on line 5—5 of Fig. 6; and

Fig. 6 is a section taken on line 6—6 of Fig. 5.

In Figs. 1 to 3, one is a frame or case carrying a flexible member such as a flexible diaphragm 2 connected at its periphery to case 1 and carrying a central boss from which extends a rod 3 which passes through the frame 1 to an external point where it may be connected to any device such as is conventional for transducers. The diaphragm 2 carries a boss on the underneath side 4 to which is attached a cable 5. The other end of the cable 5 is connected to one end 7 of spring 6, the spring being connected at its other end 8 to the frame or case. A second cable 9 is connected at 7 and at the other end to a rigid pin 10 rigidly connected to the bracket 11 which is rigidly connected as by welding to the case 1. Intermediate the ends of the cables 5 and 9, a cable 12' is connected to the cable 5 and to the cable 9 at their mid points. A pointer 14 pivoted on the frame at 16' is rigidly connected to the cable 12' and extends from the cable 12' adjacent a scale 15 which is carried on brackets 16 which are connected to the case 1 in such a manner that the pointer 14 moves over indices engraved on the scale 15. Frame 1 has cover members 17 suitably attached to the frame 1 and one of the cover members 17 is provided with a window 18 through which the scale 15 may be observed.

In the form shown in Figs. 4–6 the construction instead of the tensiometer shown in those Figs. 1, I may employ a different form of tensiometer; thus, for example, a strain gauge such as shown in the Statham Patent No. 2,720,113. As is shown in this patent the points of attachment of the strain wires to the armature and frame of each such gauge, are such as to furnish equal and opposite displacements thereof on displacement of the force summing means.

The cables 9 and 5 of Fig. 1 are separated into two parts, one part is connected to the armature of the strain gauge, and the other part is connected to the frame or case of the strain gauge.

In Fig. 4 the cable 21 is connected to the pin 25' of the lever 26 pivotal mounted in case 28 on pivot 26'. The rod 27 is attached to the lever 26. The cable 21 is connected to the frame of the strain gage 18' and the cable 22 is connected to the armature of the strain gage and to the spring 24 at point 23. The spring is connected at the other end of the spring at 25 to the frame 28. The cable 20 is connected to 23 and to the armature of the strain gage 17' and the cable 19 is connected to the frame of the strain gage 17' and to the pin 29' mounted on the lever 26. The strain gages are each wired to terminals positioned in the case.

In both of these forms the cables extend in equal tension. It will be observed that any movement of the force summing means, i.e., the diaphragm 2 (Fig. 1) or the rod 27 (Fig. 4) to rock the lever 26 on pivot 26' will cause a change in the tension which exists in one cable system connected to the diaphragm 2 or lever 26 and that an opposite change occurs in the other cable system of the pair. If we set the change in length which occurs in the cable system connected to the force summing means as $dl_1$, and $dl_2$ to the variation in length of the other cable system of the pair and $dl_3$ as the magnitude of the motion of the point 7 or 23 and $k_1$ as equal to the spring rate of the cables 5 and 9 or of the corresponding cable-strain gage combination of Figures 4 and 5, which in each pair is the same, and $k_2$ as equal to the spring rate of the spring 24 or 6 then $$dl_1 = dl_3 = \frac{k_1 dl_2}{k_2 + k_1}$$

The efficiency of transfer of the strain from the cable connected to the diaphragm is thus a function of the ratio of the spring constant of the cable systems to the spring constant of the spring.

Since the displacement of the pointer in Fig. 1 or the net output of the transducer 17' and 18' in Fig. 4 is proportional to the sum of the variations in strains in the two sets of cables, the total output or total magnitude of measurement of the variation in tension in the cables will be proportional to the following expression:

$$dl_1 + \frac{k_1 dl_1}{k_2 + k_1}$$

From the above it appears that by holding the spring rate of the spring 24 and 6 in the range of about .01 to .001 of the spring rate of the cable systems, the efficiency or magnitude of deflection may be made as high as from 99.5% to 99.95% of the total possible measurement by the tensionmeter obtainable when the spring rate of the spring is equal to zero. I may, however, reduce the spring constant of the constraining means to about zero by employing a freely hanging weight attached to the tensioned members in place of the spring in the manner employed to obtain a spring rate of about zero in my said copending application, Serial No. 502,663, now Patent No. 2,760,037. Consequently, giving effect to the efficiency of the transfer of stresses from one set of cables to the other, the total transfer of stress from one cable to the other cannot be greater than the variation in stress imposed on any one of the cables. For example, therefore, total relaxation in the wires 5 or 21 and 22 cannot impose upon the wire 9 or 19 and 20 a greater increase of stress on 9 or 19 and 20 than is the reduction in stress in the companion cables. With a finite spring rate of the spring, there will be imposed an increase in stress on such wires less than the amount of reduction in stress in the relaxed members. By setting the magnitude of stress originally present in the cables when the diaphragm 2 or rod 30 is in its neutral unloaded position and the spring rate of spring 26, the cables 19, 20, 21 and 22 or 5 or 9 cannot be stressed beyond their original design limit.

In the above forms of my invention the pair of tensioned members 5 and 9 in the form of Fig. 1 and 19 and 20 which form one of the pair of the tensioned members, and 20 and 22 which form the other of the pair of tensioned members in the form of Fig. 4, may be so suitably tensioned that the sum of the tensile stress in the tensioned members in each pair of tensioned members does not exceed, and usually is less than, the ultimate tensile stress of the tensioned members. This will assure that when one of the pairs of tensioned members is completely relaxed that the total stress imposed upon the other in the pair does not part such tensioned member.

Where the yield point of the tensioned member is not close to the ultimate tensile stress, i.e., the breaking point, it may be and usually is desirable to avoid damage to the tensioned members to make the total tension in the pair of tensioned members, i.e., the sum of the tensile stresses, not to exceed the tensile stress at the yield point of the tensioned member or the proportionality limit of the tensioned members, whichever design limitation of stress is chosen. The proportionality limit is, as is well understood, the maximum strain which is a linear function of the stress. At all strains at or below this value, the ratio of stress to strain, i.e., the spring constant of the tension member is a constant, and beyond the proportionality limit it is not a constant. Thus, in the form of Fig. 1 the tensioned members 5 and 9, and in the form of Fig. 4 the tensioned members 19 and 20, and also 21 and 22, may be stressed in tension between the point 7, 10 and 4 in the form of Fig. 1, and between the point 23, 25 and 29', each at one-half of the stress chosen as the design limit, as explained above. The stress in each of the tensioned members of each pair may be equal in each pair, or unequal, as for example, by way of illustration and not as a limitation, at 80% of the design limit in one of the pair of tensioned members, and 20% in the other of said pair of tensioned members.

Where the transducer is a strain wire transducer such as one of the unbonded type, illustrated in Fig. 4, the sum of the tensile stresses in the cables preferably should be such that when added to the initial stress in the wires of the strain gage (i.e., existing with no load on the armature of the gage) will not be greater than the ultimate tensile stress of the individual wires of the stress gage or the proportionality limit of the wires of the gage, whichever design criterion is the chosen for this limit. Under such circumstances the maximum stress imposable on the wires of the strain gage or on the cables of the transducer will not injure either of them. Since the maximum stress in the cable systems cannot exceed the design limit, the devices may be operated up to the design limit without any appreciable factor of safety.

The many forms of tensiometers which will be responsive to the changes in strain in the tensioned members which resulted from the movement of the force summing means may be employed and the forms illustrated in the following drawings showing two specific forms of tensiometers are given as examples. Any other forms may be employed as will be understood by those skilled in the art. Instead of employing a tensiometer on each of the tensioned members, I may use a tensiometer on one only of the tensioned members. Additionally, while I have described the transducers as applied to the measurement of the movement of a rod or probe which may be connected to any device which applies movement of force to the rod, it may be also applied to determine the movement of any force summing means resulting from any force. For example, it may be used in connection with load cells, poidometers, pressure gages, accelerometers, vibrometer and velocimeter.

While I have described a particular embodiment of my invention for the purpose of illustration, it should be understood that various modifications and adaptations thereof may be made within the spirit of the invention as set forth in the appended claims.

I claim:

1. A transducer, comprising a frame, a pair of tensioned members, a movable force summing means, a first support, for a first one of said tensioned members, a motion transmitting connection between said force summing means and said support, a second support connected to the first one of said tensioned members, a yieldable constraining means connected to said frame and said second support, another of said tensioned members connected to said second support and a third support for said second tensioned member, one of the tensioned members connected to and extending in tension between the first and second supports and the second of said tensioned members connected to and extending in tension between the second and third support, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, and a tensiometer responsive to the variation in tension in at least one of said tensioned members.

2. A transducer according to claim 1, wherein the spring constant of said constraining means is less than the spring constant of said tensioned members.

3. A transducer according to claim 1 in which the spring constant of the constraining means is from about .01 to about .001 times the spring constant of the tensioned members.

4. A transducer, comprising a frame, a pair of tensioned members, a movable force summing means, a first support for a first one of said pair of tensioned members, a motion transmitting connection between said force summing means and said support, a second support for said first one of said tensioned members, a yieldable constraining means connected to said frame and said second support, a third support for said second of said pair of tensioned members, one of the tensioned members of said pair connected to and extending in tension between the first and second supports and the second of said pair of tensioned members connected to and extending in tension between the second and third support, the sum of the tensions in the tensioned members being less than the ultimate tensile stress of the tensioned members, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means and a tensiometer responsive to the variation in tension in at least one of said tensioned members.

5. A transducer, comprising a pair of tensioned members, a movable force summing means, a first support, a motion transmitting connection between said force summing means and said first support, a frame, a second tensioned member support mounted on said frame, a third tensioned member support, a spring mounted on said frame, a mechanical connection between said spring and said second support, one of the tensioned members of said pair connected to and extending in tension between the first and second supports and the other tensioned member of said pair connected to and extending in tension between the second and third support, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, and a tensiometer responsive to said variation in tension of at least one of said tensioned members.

6. A transducer according to claim 5, wherein the spring constant of said spring is less than the spring constant of said tensioned members.

7. A transducer according to claim 5 wherein the spring constant of the spring is from about .01 to about .001 times the spring constant of the tensioned members.

8. A transducer, comprising a pair of tensioned members, a movable force summing means, a first tensioned member support, a motion transmitting connection between said force summing means and said first support, a frame, a second tensioned member support mounted on said frame, a third tensioned member support, a spring mounted on said frame, a mechanical connection between said spring and said second support, one of the tensioned members of said pair connected to and extending in tension between the first and second supports and the second of said pair of tensioned members connected to and extending in tension between the second and third support, the sum of the tensions in said tensioned members being less than the ultimate tensile stress of said tensioned members, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, and a tensiometer responsive to the variation in tension in at least one of said tensioned members.

9. A transducer according to claim 8 in which the spring constant of the spring is from about .01 to about .001 times the spring constant of the tensioned members.

10. A transducer, comprising a pair of tensioned members, a movable force summing means, a first support for one of said tensioned members of said pair, a motion transmitting connection between said force summing means and said first support, a frame, a support for the other of the tensioned members of said pair, mounted on said frame, means to hold the second support relatively immovable on said frame on motion of said force summing means, a third tensioned member support, a spring mechanically connected to said frame, a mechanical connection between said third support and said spring, said third support being mounted for motion relative to said second support, one of the tensioned members of said pair connected to and extending in tension between the first and third supports and the second tensioned members of said pair connected to and extending in tension between the second and third support, and means for displacing the first support relative to the second support on movement of said force summing means, whereby one of said tensioned members increases in tension while the other of said tensioned members decreases in tension on said displacement of said force summing means, and a tensiometer responsive to the variations in tension in at least one of said tensioned members.

11. A transducer according to claim 10 wherein the spring constant of said spring is less than the spring constant of said tensioned members.

12. In the transducer of claim 10, in which the spring constant of said spring is about 0.001 to about .01 times the spring constant of said tensioned members.

13. A transducer, comprising a pair of tensioned members, a movable force summing means, a first support for one of said tensioned members, a motion transmitting connection between said force summing means and said first support, a frame, a second support for the other of said tensioned members mounted on said frame, means to hold the second support relatively immovable on said frame on motion of said force summing means, a third tensioned member support, a spring mechanically connected to said frame, a mechanical connection between said third support and said spring, said third support being mounted for motion relative to said second support, one of the tensioned members of said pair connected to and extending in tension between the first and third supports and the second tensioned member of said pair connected to and extending in tension between the second and third support, tensile stress in the said tensioned members being equal and the sum of said tensile stresses less than the ultimate tensile stress of said tensioned members, means for displacing the first support relative to the second support on movement of said force summing means, whereby one of said tensioned members increases in tension while the other of said tensioned members decreases in tension on said displacement of said force summing means, and a tensiometer responsive to the variation in tension in at least one of said tensioned members.

14. A transducer, comprising a pair of tensioned members, a movable force summing means, a first support for one of said tensioned members, a motion transmitting connection between said force summing means and said first support, a frame, a second support mounted on said frame, means to hold the second support relatively immovable on said frame on motion of said force summing means, a third tensioned member support, a yieldable constraining means connected to said third support and to said frame, one of the tensioned members of said pair connected to and extending in tension between the first and third supports and the second tensioned member of said pair connected to and extending in tension between the second and third support, the tensile stresses in said tensioned members being unequal and the sum of the tensile stresses in said tensioned members being less than the ultimate tensile stress of said tensioned members, and means for displacing the first support relative to the third support on movement of said force summing means, whereby one of said tensioned members increases in tension while the other of said tensioned members decreases in tension on said displacement of said force summing means, and a tensiometer responsive to variation in tension in one of said tensioned members.

15. A transducer according to claim 14, wherein the spring constant of said constraining means is less than the spring constant of said tensioned members.

16. A transducer according to claim 14 in which the spring constant of the yieldable constraining means is from .01 to zero times the spring constant of the tensioned members.

17. A transducer according to claim 14 in which the spring constant of the yieldable constraining means is from .01 to .001 times the spring constant of the tensioned members.

18. A transducer, comprising a frame, a pair of tensioned members, a movable force summing means, a first support, for a first one of said tensioned members, a motion transmitting connection between said force summing means and said support, a second support connected to the first one of said tensioned members, a yieldable constraining means connected to said frame and said second support, the second of said tensioned members connected to said second support and a third support for said second tensioned member, one of the tensioned members connected to and extending in tension between the first and second supports and the second of said tensioned members connected to and extending in tension between the second and third support, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, a strain gage connected to one of said tensioned members intermediate the ends of said tensioned member, which ends are connected to the supports to which said tensioned member is connected.

19. A transducer, comprising a frame, a pair of tensioned members, a movable force summing means, a first support, for a first one of said tensioned members, a motion transmitting connection between said force summing means and said support, a second support connected to the first one of said tensioned members, a yieldable constraining means connected to said frame and said second support, the second of said tensioned members connected to said second support and a third support for said second tensioned member, one of the tensioned members connected to and extending in tension between the first and second supports and the second of said tensioned members connected to and extending in tension between the second and third support, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, a strain gage connected to the first one of said tensioned members between said first and second supports therefor, and a second strain gage connected to the other of said tensioned members between the second and third supports therefor.

20. A transducer, comprising a frame, a pair of tensioned members, a movable force summing means, a first support, for a first one of said tensioned members, a motion transmitting connection between said force summing means and said support, a second support connected to the first one of said tensioned members, a yieldable constraining means connected to said frame and said second support, the second of said tensioned members connected to said second support and a third support for said second tensioned member, one of the tensioned members connected to and extending in tension between the first and second supports and the second of said tensioned members connected to and extending in tension between the second and third support, and means for displacing at least one of said first and third supports to relatively vary the spacing of the first and third support relative to the second support on movement of said force summing means, whereby one of said tensioned members increases in tension while the other of said tensioned members decreases in tension on said displacement of said force summing means, a mechanical connection between said tensioned members connected to said tensioned members at a point on each tensioned member between the ends thereof, which are connected to the supports therefor, a pointer having two ends, one end of said pointer pivotally mounted on said frame, a scale, the other end of said pointer positioned adjacent the said scale.

References Cited in the file of this patent
UNITED STATES PATENTS

| | | |
|---|---|---|
| 2,522,117 | Holt | Sept. 12, 1950 |
| 2,564,416 | Wildhack | Aug. 14, 1951 |
| 2,613,536 | Jakosky | Oct. 14, 1952 |
| 2,723,565 | Griest | Nov. 15, 1955 |